UNITED STATES PATENT OFFICE.

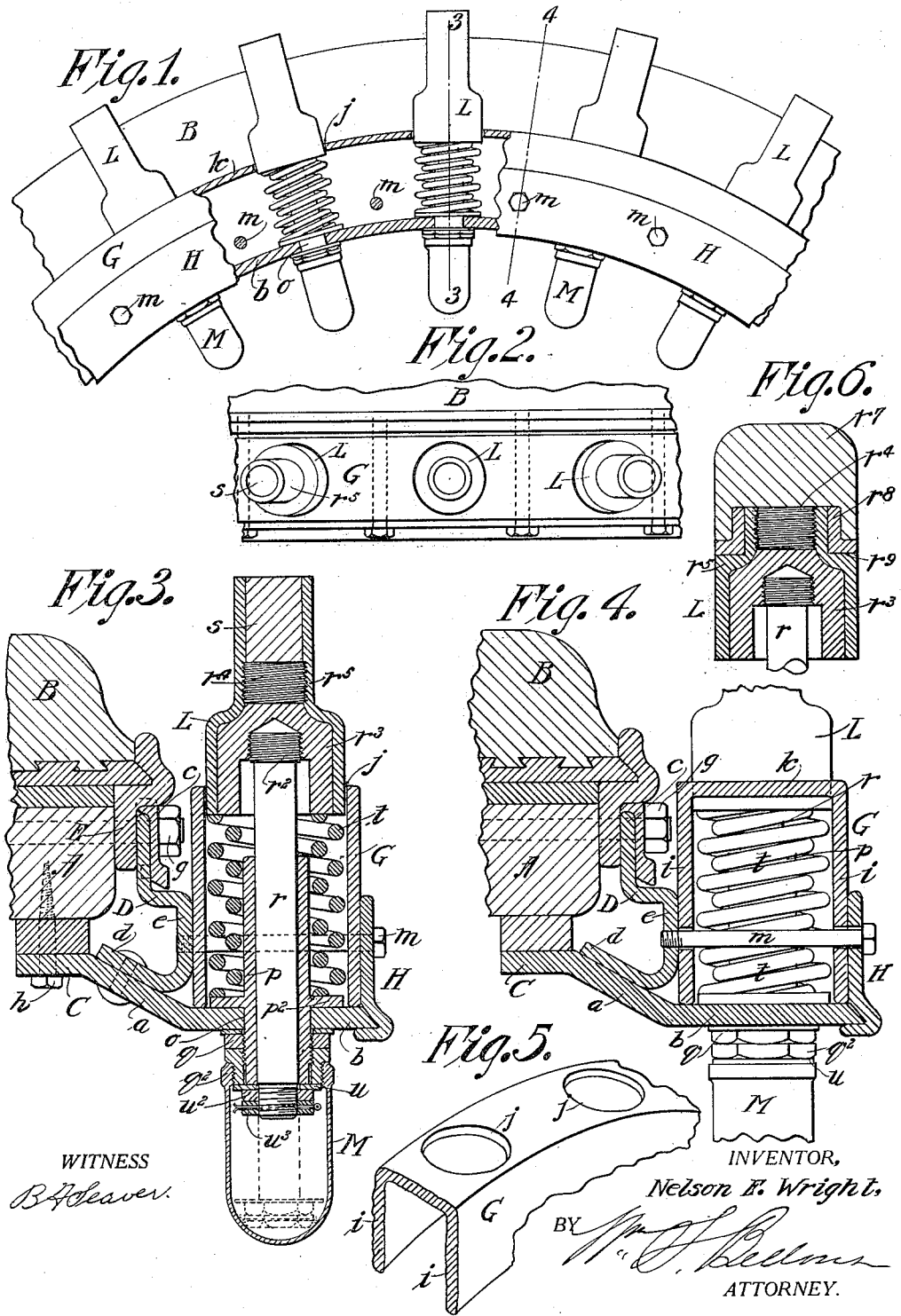

NELSON E. WRIGHT, OF SPRINGFIELD, MASSACHUSETTS.

ANTISKIDDING DEVICE FOR WHEELS.

1,193,855.  Specification of Letters Patent.  Patented Aug. 8, 1916.

Application filed November 30, 1915. Serial No. 64,234.

*To all whom it may concern:*

Be it known that I, NELSON E. WRIGHT, a citizen of the United States of America, and resident of Springfield, in the county of Hampden and State of Massachusetts, have invented certain new and useful Improvements in Antiskidding Devices for Wheels, of which the following is a full, clear, and exact description.

This invention relates to improvements in anti skidding devices or appliances for wheels, and more particularly for solid tired heavy wheels for motor trucks, although the improvements are applicable on comparatively light, pneumatic tired wheels.

The objects of the invention are to provide anti skid attachments for wheels which are entirely efficient for the required purposes, and devoid of the disadvantages attendant on the use of tire chains; to provide anti skid devices which are in whole or in part readily attachable, and detachable on the felly of the wheel; to provide constructions of the devices which are strong and durable and yet comparatively light, and to provide constructions whereby the parts of the device are readily interchangeable and renewable.

The invention is described in conjunction with the accompanying drawings and set forth in the claims.

In the drawings: Figure 1 is an elevation of a portion of a wheel as seen from the outer side thereof and showing the improved anti-skidding devices thereon. Fig. 2 is a partial plan view. Fig. 3 is a cross section on a larger scale as taken on line 3—3, Fig. 1. Fig. 4 is a cross sectional view, on the larger scale, taken on line 4—4, Fig. 1. Fig. 5 is a fragmentary perspective view showing the formation of a member prominently comprised in the improved device. Fig. 6 is a sectional view in detail illustrating a minor modification hereinafter referred to.

The improved device is described in conjunction with the drawings which show the top part of the rim of the wheel, and showing the anti skid devices upwardly projecting, and the terms "upwardly" and "downwardly" hereinafter employed are merely relative and corresponding to the given position of the revoluble wheel shown.

In the drawings, A represents the felly on which a solid rubber tire B is shown.

C represents a ring plate secured on the under side of the felly outwardly beyond the location of the wheel spokes, such ring plate having a portion $a$ extending with an outward and downward inclination and having a further portion $b$ which projects horizontally in the form of an annular shelf-like extension to one side of the felly and below the under surface thereof.

D represents an annular stay member comprising a vertical upper portion $c$, an intermediate lower portion which rests on and is secured, as by rivets, to the portion $a$ of the ring plate, and an intermediate portion $e$ having a location outwardly beyond the vertical portion $c$.

E represents the clamping ring by which the tire, at one side is secured on the wheel, and which clamping plate has a vertical portion which overlies the outer side of the felly and through which by bolts $g$ the confinement is made.

The vertical portion $c$ of the annular stay member lies facewise outside of and against the clamping ring E, and is also held firmly and rigidly connected as an appurtenance of the felly by the aforementioned bolts $g$ which pass through it as well as through the clamping ring.

The ring plate C being secured on the under side of the felly as by screws $h$, and, therefore detachable, and the rigidly and permanently connected stay member being detachable from its connection at the side of the felly, the ring plate inclusive of the stay member which braces and reinforces the same, together with the anti-skidding members and the parts combined therewith which are supported on the shelf-like extension $b$ may be bodily removed from the wheel when the presence thereof is not desired for anti-skidding or traction purposes.

G represents an annular cross sectionally trough-shaped member having the edges of its opposite walls $i$ $i$ resting on the shelf extension $b$, and having regularly spaced holes $j$ of suitable number and in suitable proximity in its portion which transversely unites the opposite side walls. The inner face of this trough shaped member G is positioned against the aforementioned outwardly located intermediate portion $e$ of the stay member; and the bolts $m$ transversely applied through the opposite walls $i$ $i$ of the member G and with a screw thread engagement in the portion $e$ of the stay member securely hold the member G in its place and against creeping or shifting in any direction. There is, preferably, employed a ring plate H between the outer face of the member G and the heads of the bolt $n$.

The aforementioned shelf-like extension $b$ is provided with regularly spaced holes $o$ in number corresponding to the aforementioned holes $j$, and in radial alinement therewith, in each of which is engaged the lower portion of a tubular bushing $p$ which has a base flange $p^2$, above which flange, as well as below which flange, the extremities of the bushing extend in the radial direction.

$q$ and $q^2$ represent nuts screw engaged on the threaded lower portion of the bushing for the confinement of the bushing rigidly as a part of the shelf extension.

L L represent the anti-skid members which are radially arranged and guided in the bushings aforementioned and in the circular holes $j$ in the trough shaped member G. Each anti-skid member as shown comprises a round stud $r$ having a screw threaded upper end portion $r^2$, a circular body $r^3$ having a threaded socket, downwardly opening, in which the stud screw engages, and provided with an upwardly extended screw threaded neck $r^4$; the said circular body $r^3$ being incased by a metallic tubular shell internally threaded and screw engaged with the neck $r^4$ and being of reduced diameter at its outer portion. The said shells may be produced from steel tubing drawn or stamped to shape and when screw engaged on the body portions $r^3$ which form the head members of the studs may serve as wear pieces having guidance through the holes $j$ and also provide outwardly open sockets in which fillings $s$ of non-metallic material may be contained, such fillings consisting of wooden plugs driven in with a tight fit, rubber in any of its elastic or non-elastic compounds or other frictional material or composition. Spiral springs $t$ are interposed between the outer wall, or "roof," of the member G and the bushing flanges, and in encircling relation to the studs $r$. The outward movement of each anti skid member is limited by a collar $u$ held against a shouldered lower portion of the stud $r$ by the nut $u^2$ and jam nut $u^3$.

In traction the anti-skid members are crowded inwardly from their extensions considerably outwardly beyond the tire tread, their play being against and with the reaction of the springs $t$; and for preventing dirt, mud or moisture from entering the bushings through which the studs are guided, dust caps M are screw engaged on and carried by the jam nut $q^2$ employed in the confining means for the bushings.

Instead of removing the ring plate C with its stay member D, and bodily therewith all of the parts carried on the shelf-like extension, the ring-plate comprising the said extension may be left in place on the wheel, and the trough member G removed after the disconnection individually of the series of anti-skid members as may be performed by the disconnection of the dust caps and nuts which hold the collars $u$ on the lower ends of the studs $r$.

The outwardly protruding portions of the anti-skid members L may be variable in shape and character and more or less dissimilar from those represented in Fig. 3, that is, for instance, as seen in Fig. 6, the inclosing sheath or shell $r^5$ may terminate about even with the top of the neck $r^4$ and have molded thereon an extension composed for the most part of comparatively soft rubber $r^7$ but having a base portion $r^8$ of hard rubber such base portion directly engaging the neck $r^4$ and resting on the shoulder $r^9$ of the body $r^3$ below and outside of the neck.

When the anti-skid members become worn or broken, any of the parts by which they are constituted may be replaced: for instance, when the outer tractional portion in which the tubular metallic sheath $r^5$ is comprised requires replacement, it is only necessary to unscrew such portion from the neck of the body $r^3$ and substitute it for a new counterpart; and there is the capability for interchange of any of the other parts of the anti-skid members or of the supporting and guiding equipments therefor.

I claim:—

1. A tire-provided wheel having a shelf-like extension, projecting from the side of the felly, an annular, cross sectionally trough-shaped member having the edges of its opposite walls supported on said extension, and provided with regularly spaced holes in its transverse opposite wall-uniting portion, means for confining said annular member rigidly on the wheel, a series of anti-skid members guided through said holes, springs by which said members are yieldingly inwardly resisted, and means for limiting the outward movements of the anti-skid members relatively to the annular trough shaped member.

2. A tire-provided wheel having a shelf-like extension, projecting from the side of the felly, and provided with regularly spaced holes, an annular cross sectionally trough shaped member having the edges of its opposite walls supported on said extension, and provided with regularly spaced holes in its transverse opposite wall-uniting portion, which are radially alined with those in said extension, means for confining said annular member rigidly on the wheel, a series of anti-skid members guided through the holes in said wall uniting portion, and having inwardly extending studs having guiding engagements through the said holes in the shelf like extension, springs within the trough shaped member by which said anti-skid members are yieldingly inwardly resisted, and means for limiting the outward movements of the anti-skid members relatively to the annular trough shaped members.

3. A tire-provided wheel having a shelf-like extension projecting from the side of the felly, and provided with regularly spaced holes, an annular cross sectionally trough shaped member having the edges of its opposite walls supported on said extension, and provided with regularly spaced holes in its transverse opposite wall-uniting portion, which are radially alined with those in said extension, means for confining said annular member rigidly on the wheel, a series of anti-skid members guided through the holes in said wall uniting portion, and having inwardly extending studs having guiding engagements through and inwardly beyond the said holes in the shelf-like extension, springs within the trough shaped member by which said anti-skid members are yieldingly inwardly resisted, and nuts on the inner ends of the studs, for limiting the outward movements of the anti-skid members.

4. A tire-provided wheel having a shelf-like extension projecting from the side of the felly, and provided with regularly spaced holes, tubular bushings having portions engaged through said holes, and radially outwardly projecting relatively to the extension, and means for the confinement of the bushings on the extension, an annular cross sectionally trough shaped member having the edges of its opposite walls supported on said extension, and provided with regularly spaced holes in its transverse opposite wall uniting portions which are radially alined with those through said bushings, means for confining said annular member rigidly on the wheel, a series of anti-skid members guided through the holes in said wall uniting portion, and provided with inwardly extending studs having guiding engagements through the bushings, springs in compression within the trough shaped member surrounding the bushings, and exerting their pressure outwardly against the anti-skid members, and nuts on the inner ends of the studs for limiting the outward movements of the anti-skid members.

5. A tire-provided wheel having a shelf-like extension projecting from the side of the felly, an annular cross sectionally trough shaped member having the edges of its opposite walls supported on said extension, and provided with regularly spaced holes in its transverse opposite wall-uniting portion, means for confining said annular member rigidly on the wheel, a series of anti-skid members each consisting of a body portion, a screw engaged interchangeable traction member, extending outwardly from said body portion and an inwardly projecting stud having a guiding engagement through the shelf-like member and provided at its inner end with a limiting nut and springs within the trough shaped annular member exerting outward pressures against the anti-skid members.

6. In an anti-skid wheel, a felly having a tire thereon, a sidewise applied ring for clamping the tire on the felly, said felly having a ring-plate secured on its under side and projecting in the form of an annular shelf-like extension to one side of the felly, an annular stay member comprising a vertical upper portion arranged alongside the outer face of the clamping ring, and an inturned lower portion resting on and secured to the shelf-like extension, bolts connecting the vertical upper portion of said annular stay member, the clamping ring and the felly together, a cross sectionally trough shaped annular member having the edges of its opposite walls supported on the shelf-like extension and having regularly spaced holes in its transverse opposite wall-uniting portion, bolts transversely connecting the trough member and the intermediate portion of said stay member, and yieldable anti-skid members playing radially through and outwardly beyond said regularly spaced holes.

7. In an anti-skid wheel, a felly having a tire thereon, a ring for clamping the tire on the felly, a ring-plate secured on the under side of the felly and projecting in the form of an annular shelf-like extension to one side of the felly, an annular stay member comprising a vertical upper portion arranged alongside the outer face of the clamping ring, an inturned lower portion resting on and secured to the shelf-like extension, and an intermediate portion having a location outwardly beyond the vertical upper portion, bolts connecting the vertical upper portion of the annular stay member, the clamping ring and the felly together, a cross sectionally trough shaped annular member having the edges of its opposite walls supported on the shelf-like extension having its inner wall against the outwardly located intermediate portion of the stay member and having regularly spaced holes in its transverse opposite wall-uniting portion, bolts transversely connecting the trough member and the intermediate portion of said stay member, and yieldable anti-skid members playing radially through and outwardly beyond said regularly spaced holes.

8. In an anti-skid wheel, a felly having a tire thereon, a ring for clamping the tire on the felly, and a ring-plate secured on the under side of the felly and having a portion extended outwardly and downwardly and a further portion projecting horizontally in the form of an annular shelf-like extension to one side of the felly, an annular stay member comprising a vertical upper portion arranged alongside the outer face of the clamping ring, and an inturned lower portion resting on and secured to the downwardly inclined portion of the ring plate, bolts connecting the vertical upper portion of said annular stay members, the clamping ring and the felly together, a cross sectionally trough shaped annular member having the edges of its opposite walls supported on the shelf-like extension and having regularly spaced holes in its transverse opposite wall-uniting portion, bolts transversely connecting the trough member and the intermediate portion of said stay member, and yieldable anti-skid members playing radially through and outwardly beyond said regularly spaced holes, and having guide studs guided through the shelf-like extension, and springs within the annular trough member for yieldingly resisting the inward movements of the anti-skid members.

9. A tire provided wheel having a sidewise located shelf-like extension, radially arranged anti-skid members comprising studs having screw threaded upper ends, and circular bodies, having threaded sockets with which said studs engage, and provided with outward extensions, means for radially guiding said members relatively to said support, and springs against which said members are inwardly movable.

10. A tire provided wheel having a sidewise located shelf-like extension, radially arranged anti-skid members comprising studs having screw threaded upper ends, and circular bodies having threaded sockets with which said studs engage, and provided with upwardly extending necks, metallic shells screw engaged on said necks and surrounding the circular bodies, and having outward extensions normally projecting beyond the tire tread, means for radially guiding said members relatively to said support, and springs against which said members are inwardly movable.

11. A tire provided wheel having a sidewise located shelf-like extension, radially arranged anti-skid members comprising studs having screw threaded upper ends, and circular bodies, having threaded sockets with which said studs engage, and provided with outward tubular extensions having open ends, and having non-metallic material in said extensions, means for radially guiding said anti skid members relatively to said support, and springs against which said members are inwardly movable.

12. A tire provided wheel having a sidewise located shelf-like extension, an annular cross sectionally trough shaped member having the edges of its opposite wall supported on said extension, and provided with regularly spaced holes in its intermediate wall uniting portion, and means for confining said annular member rigidly on the wheel, radially arranged anti skid members comprising studs having screw threaded upper ends, and circular bodies having threaded sockets with which said studs engage, and having outward extensions normally projecting beyond the tire tread, said anti-skid members being guided in the holes in said annular trough shaped member, and through the shelf-like extension, and springs against which said members are inwardly movable.

13. A tire provided wheel having a sidewise located shelf-like extension, an annular cross sectionally trough shaped member having the edges of its opposite wall supported on said extension, and provided with regularly spaced holes in its intermediate wall uniting portion, and means for confining said annular member rigidly on the wheel, radially arranged anti skid members comprising studs having screw threaded upper ends, and circular bodies having threaded sockets with which said studs engage, and provided with upwardly extending necks, metallic shells screw engaged on said necks and surrounding the circular bodies, and having outward extensions normally projecting beyond the tire tread, said anti-skid members being guided in the holes in said annular trough shaped member, and through the shelf-like extension, and springs against which said members are inwardly movable.

Signed by me at Springfield, Mass., in presence of two subscribing witnesses.

NELSON E. WRIGHT.

Witnesses:
 G. R. DRESIOL,
 J. D. LONG.

Copies of this patent may be obtained for five cents each, by addressing the "Commissioner of Patents, Washington, D. C."